United States Patent [19]

Robinson et al.

[11] 3,753,775

[45] Aug. 21, 1973

[54] CHEMICAL POLISHING OF SAPPHIRE

[75] Inventors: Paul Harvey Robinson; Richard Oren Wance, both of Trenton, N.J.

[73] Assignee: RCA Corporation, New York, N.Y.

[22] Filed: Mar. 1, 1971

[21] Appl. No.: 122,620

[52] U.S. Cl. ........... 117/213, 117/47 R, 117/106 A, 156/17, 148/175

[51] Int. Cl. ........................... C23b 5/62, B44d 1/18

[58] Field of Search ....................... 117/1.6 A, 47 R, 117/213; 148/175; 156/17

[56] References Cited

UNITED STATES PATENTS 3,476,617 11/1969 Robinson ........................... 148/175

OTHER PUBLICATIONS

Filbey et al., Single-crystal Film of Silicon on Insulators, Brit. J. Appl. Phys. 1967, Vol. 18, pp. 1357 and 1364, 1365.

Robinson et al., The Deposition of Silicon upon Sapphire Substitutes, Metall. Soc. of AIME, Vol. 236, pp. 268–274.

*Primary Examiner*—Alfred L. Leavitt
*Assistant Examiner*—M. F. Esposito
*Attorney*—Glenn H. Bruestle, R. Williams, H. Christoffersen and A. Spechler

[57] ABSTRACT

The [1$\bar{1}$02] crystallographic oriented surface of a sapphire body is chemically polished by heating the body to a temperature of between 1,000°C and 1,200°C and contacting the surface of the body with vapors of borax.

7 Claims, 1 Drawing Figure

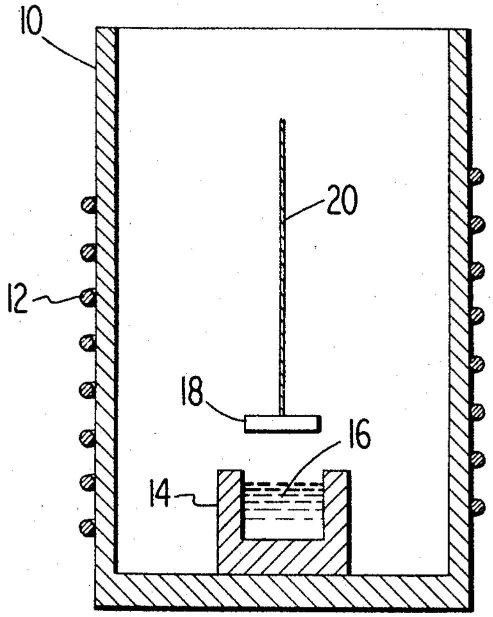
INVENTOR.
Paul H. Robinson and
Richard O. Wance.
BY
ATTORNEY

CHEMICAL POLISHING OF SAPPHIRE

BACKGROUND OF THE INVENTION

The invention herein disclosed was made in the course of or under a contract or subcontract thereunder with the Department of the Air Force.

The present invention relates to a method of polishing the surface of a body of sapphire, and more particularly to a method of chemically polishing the sapphire body.

A recent development in the semiconductor field is the forming of semiconductor devices in thin films of single crystalline silicon epitaxially grown on a body of an electrical insulating material. One of the electrical insulating materials on which the single crystalline silicon can be epitaxially grown is sapphire. The sapphire used for this purpose is generally formed as a boule using one of the various well-known techniques for forming single crystalline bodies. The boule is then sliced, such as by sawing, along desired crystallographic planes to form the individual bodies on which the single crystalline silicon is to be grown. The sawing of the boule into the individual bodies introduces surface defects in the surface of the body on which the single crystalline silicon is to be grown. Such defects are undesirable since they adversely affect the crystal structure of the grown silicon. Therefore, the surfaces of the sapphire bodies are polished to remove the defects. The bodies are generally polished mechanically by first lapping with a relatively course polishing grit and then with succeedingly finer grits until a mirror smooth surface is achieved. The mechanical polishing of the bodies is a time consuming and relatively expensive operation. In addition, although the mechanical polishing produces a mirror smooth surface, it often does not remove some very fine defects in the surface. Although the defects not removed may be so fine that they can only be seen under a very powerful microscope, such fine defects can still adversely affect the properties of the single crystalline silicon grown directly over the defect.

SUMMARY OF THE INVENTION

The surface of a sapphire body is polished by contacting the surface with vapors of borax.

BRIEF DESCRIPTION OF DRAWING

The FIGURE of the drawing is a schematic view of a form of an apparatus for carrying out the polishing method of the present invention.

DETAILED DESCRIPTION

We have discovered that the surface of a sapphire body can be polished to obtain a smooth, work damage free, scratch free surface by contacting the surface of the sapphire body with the vapors of borax, $Na_2B_4O_7$. More particularly, the [1$\bar{1}$02] crystallographic oriented surface of the sapphire body can be so polished with the sapphire body being heated to a temperature of between 1000°C and 1200°C. It has been found that the borax vapors etch the surface of the sapphire body at a rate of approximately one mil per hour to achieve the polished surface. The surface of the sapphire body polished by the present method is sufficiently free of work damages and scratches that when single crystalline silicon is epitaxially deposited on the surface, the silicon has electrical properties at least as good as silicon grown on the best mechanically polished surface. However, the polishing method of the present invention can be carried out more easily and quickly than the mechanical polishing technique. Also, the polishing method of the present invention removes defects underlying the uppermost surface of the body which are generally not removed by mechanical polishing. The method of the present invention can not only be used to polish the "as sawed" surfaces of a sapphire body to remove the work damages for the surfaces, but can also be used to polish previously mechanically polished surfaces so as to remove any defects not removed by the mechanical polishing.

Referring to the drawing there is shown a form of an apparatus for carrying out the polishing method of the present invention. The apparatus comprises a furnace 10 having a heating means 12, which is shown to be a resistance heating coil, surrounding the furnace. A crucible 14 of a material which will not react with borax at high temperatures, such as platinum, is seated in the furnace 10. The crucible 14 contains a charge 16 of borax. The sapphire body 18 is supported, such as by a platinum wire 20, within the furnace 10 and above the crucible 14 with the surface of the body to be polished facing the borax charge 16.

To polish the surface of the sapphire body 18, the heater 12 is turned on to heat the borax charge 16 and the sapphire body 18. The borax charge 16 is heated until the borax becomes molten and vaporizes. The sapphire body 18 is heated to a temperature of between 1000°C and 1200°C. The borax vapors from the molten charge 16 flow upwardly and contact the surface of the sapphire body 18. The borax vapors which contact the surface of the sapphire body 18 uniformly etch the surface of the body until a polished surface free of work damage defects and scratches is obtained.

The [1$\bar{1}$02] crystallographic oriented surface of a group of sapphire bodies were polished by the method of the present invention for a period of approximately one hour using an apparatus of the type shown in the drawing. After cleaning the sapphire bodies in boiling water, epitaxial silicon was grown on the polished surfaces of the bodies. The epitaxial silicon films grown on some of the sapphire bodies contained an acceptor impurity, boron, at concentration of approximately $1 \times 10^{17}cm^{-3}$ and the epitaxial silicon films grown on the other sapphire bodies contained a donor impurity, arsenic, at a concentration of approximately $1 \times 10^{16}cm^{-3}$. The epitaxial silicon films were grown on the sapphire bodies by placing the bodies in a deposition chamber. A flow of a gaseous mixture of silane, hydrogen and either diborane or arsine, depending on the impurity to be included in the silicon, was passed through the chamber. The chamber was heated to a temperature, approximately 1050°C, at which the gaseous mixture reacted to deposit on the bodies the single crystalline silicon containing the desired impurity. The mobilities of the epitaxial silicon grown on the bodies were then tested. The hole mobilities of the epitaxial silicon containing the acceptor impurity ranged from 150 to $200cm^2$/volt-sec; and the electron mobilities of the epitaxial silicon containing the donor impurity varied from 350 to 450 $cm^2$/volt-sec. These mobilities are approximately equivalent to those obtained on sapphire bodies which are mechanically polished.

We claim:

1. A method of polishing the surface of a body of sapphire comprising contacting the surface of the body with vapors of borax from molten borax, without immersing said surface in said molten borax.

2. The method of claim 1 wherein the body is heated to a temperature of between 100°C and 1200°C.

3. The method of claim 2 wherein the [1$\bar{1}$02] crystallographic oriented surface of the body is contacted with the borax vapors.

4. A method of polishing the surface of a body of sapphire comprising the steps of
supporting the body over a charge of borax,
heating the body, and
heating the borax to its vaporization tempera-ture so as to provide borax vapors which contact the surface of the body.

5. The method of claim 4 wherein the body is heated to a temperature of between 1000°C and 1200°C.

6. The method of claim 5 wherein the body has a [1102] crystallographic oriented surface and said surface is exposed to the borax vapors.

7. A method of forming a composite article comprising
contacting a surface of a body of sapphire with vapors of borax to polish said surface, and
growing a film of epitaxial silicon on said surface of the body.

* * * * *